United States Patent [19]

Cotter

[11] 3,919,473

[45] Nov. 11, 1975

[54] SIGNAL CORRECTION SYSTEM

[75] Inventor: Douglas A. Cotter, Raleigh, N.C.

[73] Assignee: Corning Glass Works, Corning, N.Y.

[22] Filed: Jan. 2, 1974

[21] Appl. No.: 429,742

[52] U.S. Cl. .......................... 178/7.2; 178/DIG. 39
[51] Int. Cl. .......................... H04n 5/14
[58] Field of Search .......................... 178/7.1, 7.2, DIG. 39

[56] References Cited

UNITED STATES PATENTS

| | | | |
|---|---|---|---|
| 3,462,547 | 8/1969 | Macovski | 178/7.1 |
| 3,584,146 | 6/1971 | Cath et al. | 178/7.2 |
| 3,743,772 | 7/1973 | Pieters et al. | 178/7.2 |
| 3,800,078 | 3/1974 | Cochran et al. | 178/7.1 |

*Primary Examiner*—Richard Murray
*Assistant Examiner*—Aristotelis M. Psitos
*Attorney, Agent, or Firm*—Walter S. Zebrowski; Clarence R. Patty, Jr.; Richard E. Kurtz

[57] ABSTRACT

In a system producing stored digital words representing an optical image, a digital error correction system automatically corrects the video signal for shading. A television camera converts the optical image of a laboratory microscope slide into an analog electrical signal representing the optical image along a raster of scan lines. An analog-to-digital converter produces digital words representing the magnitude of the video signal at periodic times along each scan line. These words are stored to represent the optical characteristics of the image. In order to correct the analog video signal for shading error, digital words representing the pattern of the shading are stored in a digital memory. This memory is loaded during intervals in which the analog signal represents only the shading. During this time, the video signal is converted to digital words and stored in the digital memory. Thereafter, during normal operation, these digital words are converted to an analog error signal which is subtracted from the video signal.

7 Claims, 11 Drawing Figures

ADAPTIVE SIGNAL CORRECTION SYSTEM

SIGNAL CORRECTION SYSTEM

BACKGROUND OF THE INVENTION

This invention relates to signal correction systems and more particularly to a system for correcting a video signal for shading.

In information processing systems, a signal containing an error component is often encountered. It is desirable to add the negative of the error component to cancel the error and produce undistorted information.

For example, it is desirable to correct a television image for shading. The shading can be caused by nonuniform light response of the camera tube or simply nonuniform light striking the photoconductive surface.

An example of a system in which it is desired to correct a video signal for shading is an automated laboratory microscope slide analyzer. One such system is shown in my copending application Ser. No. 353,004, Image Scanning Converter for Automated Slide Analyzer, filed Apr. 20, 1973 and now abandoned. In such a system, a television type image-scanning detector converts the optical image of a laboratory microscope slide to an analog video signal. A high speed analog-to-digital converter produces digital words representing the video signal at periodic timing intervals. An address generator continuously generates the correct location in a memory for the storage of these digital words.

The present invention is suitable for use in a system of the type described above.

SUMMARY OF THE INVENTION

In accordance with this invention, a signal containing an error component is corrected by subtracting the error component to produce undistorted information in a manner such that the system can be adapted to changes in the error signal.

An error signal pattern is stored in a digital memory. Upon the occurrence of timing pulses, words from this memory are transferred to a digital-to-analog converter. The analog output of the converter is an approximation to the error signal. It is subtracted from the input signal in order to produce an undistorted signal.

A principal advantage of this system is its adaptability to a change in the amplitude or pattern of the error signal. A change in the error signal can be compensated for by changing the values stored in the memory. During intervals in which the signal represents only the error signal, the error signal is digitized and stored in the memory.

In accordance with an important aspect of this invention, a video signal is corrected for shading. A television camera sequentially scans an optical image such as the image of a laboratory microscope slide. Because of nonuniform light response of the camera tube or nonuniform light striking the photoconductive surface, the video signal may be shaded. The pattern of this shading is converted to digital words which are stored in memory. During normal operation of the system in which the television camera is scanning an optical image, the memory is periodically strobed to read out the error words. These words are converted into an error signal which is subtracted from the video signal of the television camera.

The foregoing and other objects, features and advantages of the invention will be better understood from the following more detailed description and appended claims.

DESCRIPTION OF THE PREFERRED EMBODIMENT

Figure 1:
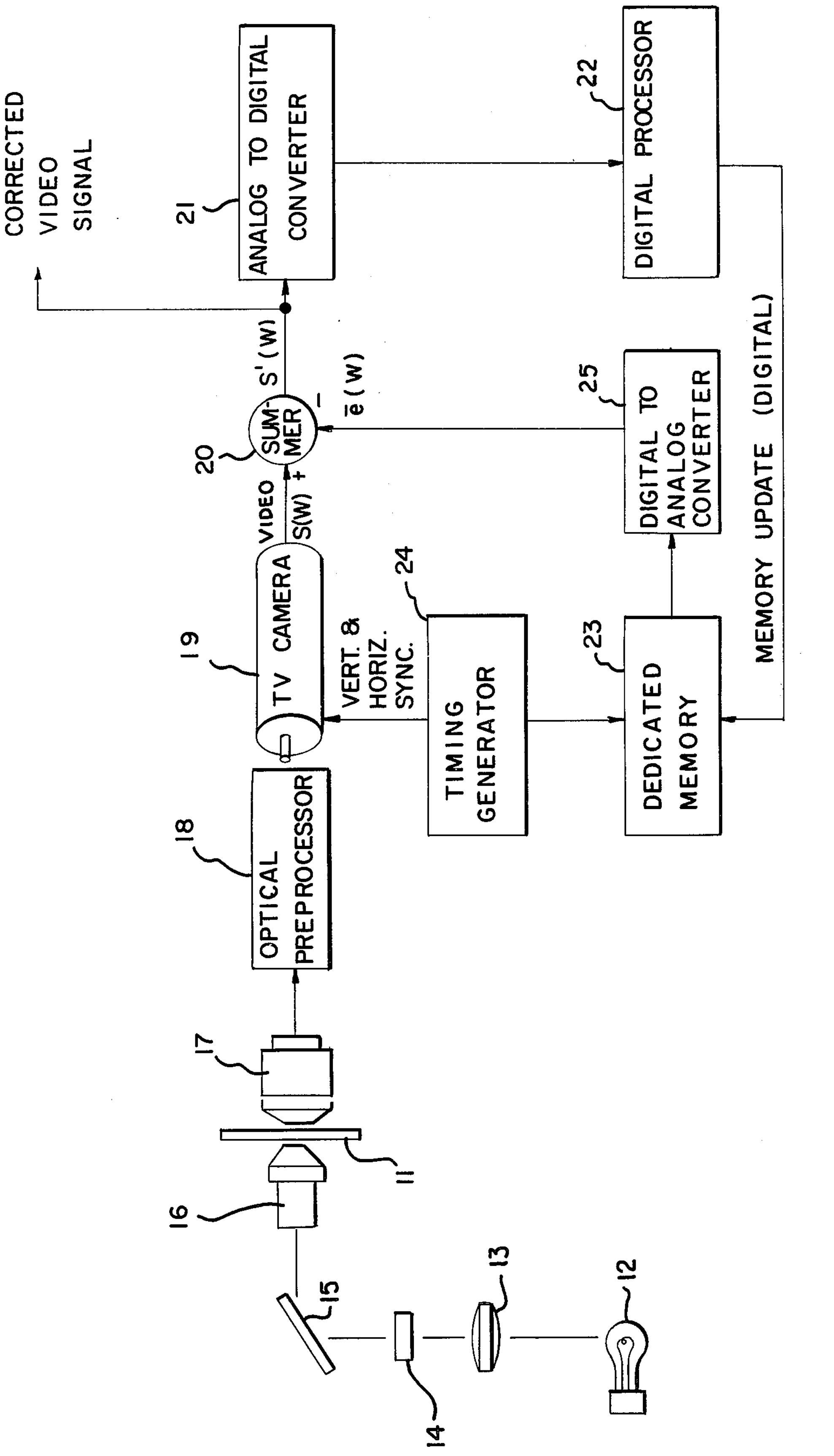
FIG. 1 is a block diagram of an adaptive signal correction system for a video signal.

FIG. 1 shows the present invention applied to a system for digitizing the characteristics of a laboratory slide 11. For example, this may be a blood-smeared microscope slide. Light from the lamp 12 passes through condenser lens 13 and heat filter 14. It is reflected by a cold mirror 15 in the condensing path to protect other optical elements from unnecessary heat. The light passes through condenser lens 16 and the microscope slide 11. The objective lens 17 forms an image of the slide.

Optical preprocessor 18 applies the image to the vidicon television camera 19. TV camera 19 scans the optical image in a raster of scan lines to produce an analog video signal representing the optical image along the scan lines.

The video signal is applied to a summer 20 which corrects for the error as will be subsequently described. The corrected video signal is applied to analog-to-digital converter 21 which produces digitized words representing the characteristics of the microscope slide. These are applied to the digital processor 22 which stores the words. A typical application of a system of this type is the analysis and classification of blood types. The digital processor 22 performs this classification.

What has been described thus far is a typical microscope slide analysis system of the type shown in the aforementioned application Ser. No. 353,004 and now abandoned.

Figures 2, 3:
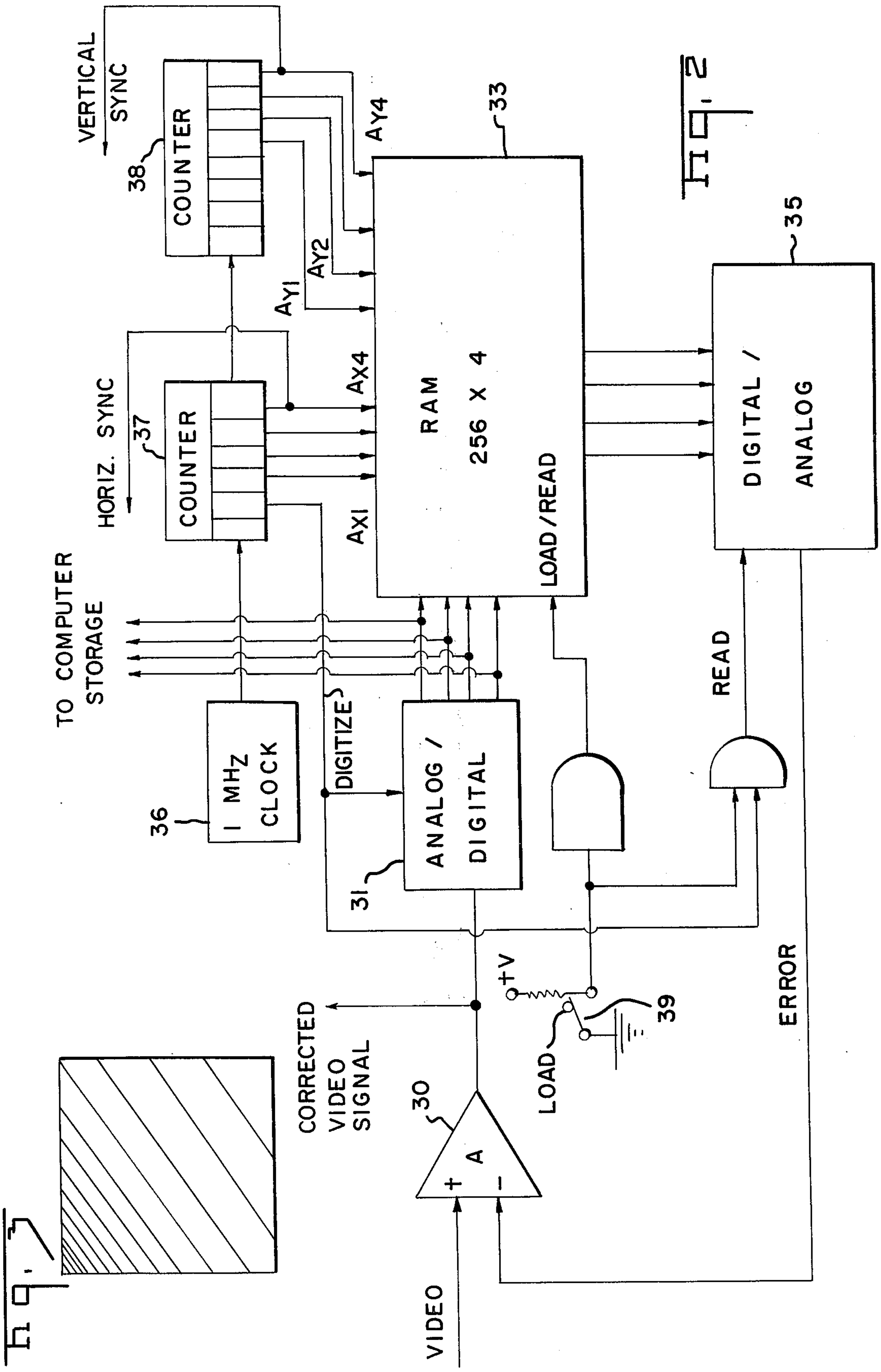
FIG. 2 is a logic diagram of the timing generator and memory.
FIG. 3 depicts a TV image of a blank field with shading.

FIG. 3 depicts a TV image of a blank field which contains shading. The shading is a linearly decreasing dark to light region across the image and down the image. The shading may be caused by uneven illumination from the lamp 12 or by uneven response of the TV camera 19. The video signal can be corrected for shading by the present invention. A digital memory 23 stores digital words representing the pattern of this shading.

Timing generator 24 generates timing pulses which periodically read words from memory 23 to the digital-to-analog converter 25. Digital-to-analog converter 25 converts the words to an analog error voltage which is applied to summer 20 in such manner as to cancel the error in the video signal.

The timing generator 24 also generates vertical and horizontal sync pulses for the TV camera 19. This maintains the generation of the error signal in synchronism with the generation of the video signal by the camera 19.

FIG. 2 shows logic circuitry for carrying out the invention. For simplicity of description, the digital processor of FIG. 1 has not been shown in FIG. 2. The function of the digital processor in this invention is performed by the logic circuitry of FIG. 2.

An operational amplifier 30 performs the function of the summer. The video signal applied to difference amplifier 30 must be constant from field to field. That is, those errors which are caused by optical or electronic distortion of the television image must be constant from field to field. The video signal is periodically converted to 4-bit digital words by the analog-to-digital converter 31. In normal operation, these 4-bit digital words are transferred to storage in a computer where they are further processed.

The error matrix is stored in the random access memory 33. In one embodiment, this memory is a 16×16 word memory. That is, the memory stores 256 4-bit words.

Loading and reading of the memory 33 is controlled by the timing generator which includes the 1 MHz clock 36 and counters 37 and 38. The counter 37 divides the clock pulses down to produce the signals $A_{X1}$, $A_{X2}$, $A_{X3}$ and $A_{X4}$ which load, or read, sixteen memory addresses across the memory 33. That is, each scan line of the video picture is digitized at sixteen locations. The error at these sixteen points is stored as a line in the memory 33. The counter 38 further divides the clock pulses down to produce the signals $A_{Y1}$, $A_{Y2}$, $A_{Y3}$ and $A_{Y4}$ controlling the sixteen lines in which the 4-bit words are stored.

During normal operation, the 4-bit words are converted to an analog error signal in the digital-to-analog converter 35, the output of which is applied to the difference amplifier 30.

The switch 39 controls whether the memory 33 is in the load or the read mode of operation. In the load mode, digital words representing the error component are loaded into the memory 33. In the read mode, these digital words are read out of the memory 33 and are converted to an analog error voltage by the digital-to-analog converter 35.

Figures 4A, 4B, 4C, 4D, 4E, 4F, 4G, 4H:
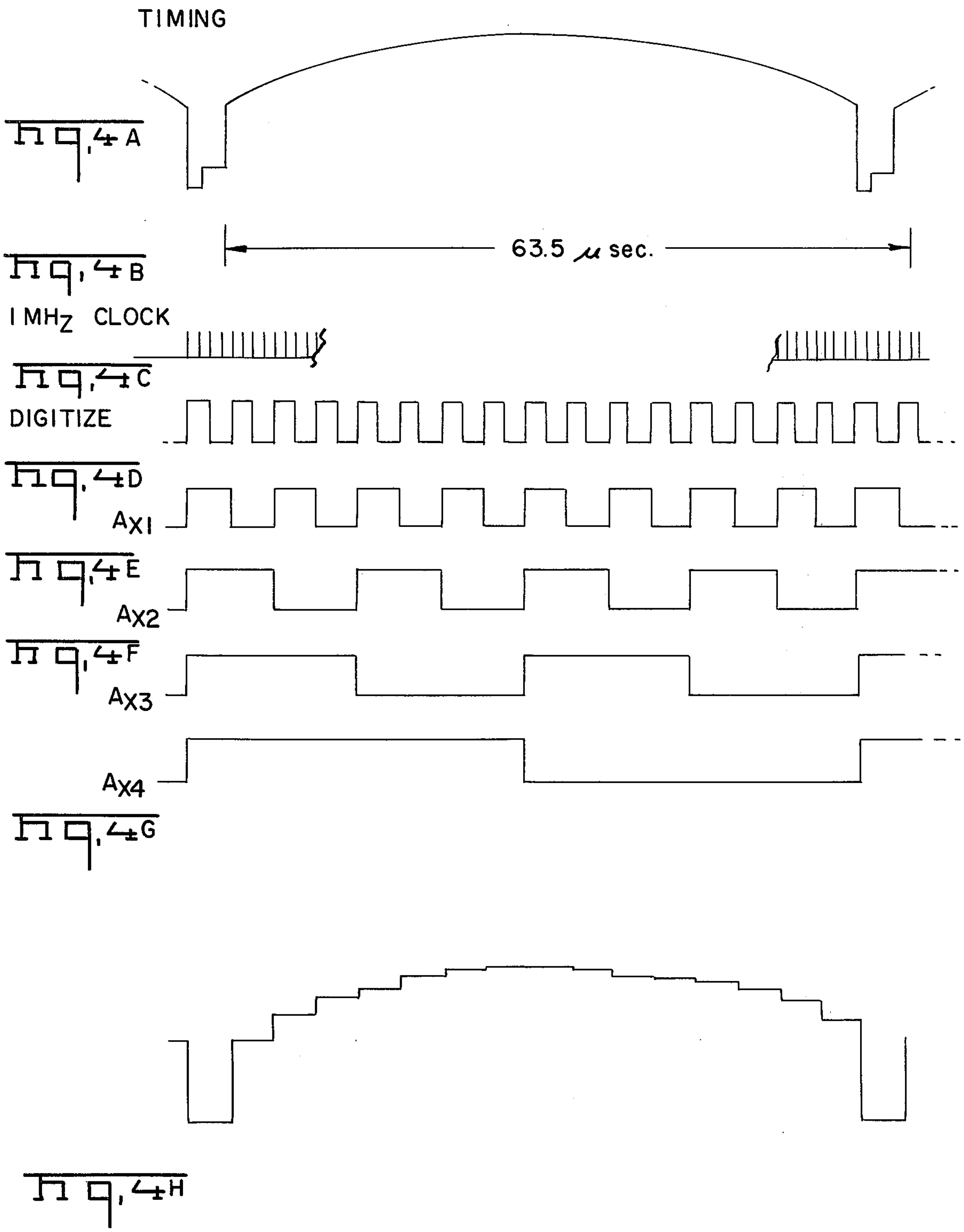
FIGS. 4A-4H are waveforms depicting the operation of the system.

The operation of the system can be better understood with reference to the waveforms of FIGS. 4A-4H. First, the memory 33 is loaded with digital words representing the pattern of the shading. In order to do this, the image of a blank slide is formed. One horizontal sweep of the video signal from camera 19 is depicted in FIG. 4A. The video signal shows an increased brightness in the middle of the picture, that is between the two horizontal sync pulses which are shown in FIG. 4A. The clock pulses, FIG. 4B, are divided down by the counter 37. The second stage of the counter produces the waveform of FIG. 4C which is applied to the analog-to-digital converter 31 to digitize the video signal. The 4-bit words are stored in memory locations specified by the waveforms of FIGS. 4D-4G. The first 4-bit word is stored in the first location of the first line of memory 33. That is, the four horizontal address lines are at logic levels 0111. The second digitized sample is stored in the second location of the first line as specified by the address lines being at logic levels 1011. The third sample is stored in the third location because the address lines are at logic levels 0011 and so on. Sixteen digitized samples are stored. At the end of the first scan line, the signal $A_{X4}$ is used to generate another horizontal sync pulse. The output $A_{Y1}$ of counter 38 steps the loading to the next line of the memory 33. Sixteen samples are loaded in this line. The loading continues until sixteen lines of sixteen words each have been loaded.

The system is now ready for normal operation. The switch 39 is set to the read position and a microscope slide is inserted into a position in which an image can be formed. During each scan line of the video signal, the signals $A_{X1}$-$A_{X4}$ read out the sixteen digital words specifying the error for that line. The digital-to-analog converter 35 converts these words to the analog error voltage shown in FIG. 4H. This is subtracted from the video signal in the difference amplifier 30 to produce a distortion-free video signal.

For simplification, the system has been described as one in which only 256 digital words are produced for each field of the video picture. In the aforementioned Cotter patent application, there is described a system in which 2,304 digital words are produced for each field. It will be understood that the system as described herein could be expanded to digitize 2,304 words to specify the error pattern stored in memory 33. Alternatively, and more advantageously, it is possible to store only 256 words specifying the error pattern as described herein while digitizing 2,304 words to specify the brightness of each field. The 2,304 words will be stored in a memory and will represent a picture substantially without shading error because the shading does not change significantly from point to point. Therefore 256 words are sufficient to specify the shading pattern whereas 2,304 words are necessary to store the optical characteristics of the slide with the desired resolution.

It will be appreciated that a small digital computer, which is normally part of the system, can be used to generate the error pattern and store it in the proper addresses in the memory 23.

The foregoing and other modifications are within the true spirit and scope of this invention.

What is claimed is:

1. A signal processing system wherein an input signal S(w) contains an error component $e$(w) and a signal component s(w) comprising:

a summer, said input signal being applied to said summer;

a digital memory storing digital words representing the pattern of said error component $e$(w);

a digital-to-analog converter, said digital words being applied to said digital-to-analog converter to produce an analog error signal $\bar{e}$(w), said error signal being applied to said summer to produce an approximation S'(w) of said signal component;

an analog-to-digital converter, the output of said summer being applied to said analog-to-digital converter; and digital logic circuitry operable during intervals of time when said signal component is zero to load digital words from said analog-to-digital converter, said digital words representing the pattern of said error signal, said digital words being loaded into said digital memory to update the contents of said memory thereby providing a new error correction $\bar{e}$(w).

2. In a system producing stored digital words representing the optical characteristics of an optical image of the type including a scanning detector for sequentially scanning said optical image in a raster of scan lines to produce an analog electrical signal representing said optical image along said scan lines and an analog-to-digital converter responsive to a timing pulse input for producing a digital word representing the magnitude of said analog signal at the occurrence of each timing pulse, a system for correcting said analog electrical signal for shading of said optical image comprising:

a summer, said analog electrical signal being applied to said summer;

a digital memory storing digital words representing the pattern of said shading;

a digital-to-analog converter, said digital words from said memory being applied to said digital-to-analog converter to produce an error signal representing said shading, said error signal being applied to said summer to produce an output of said summer representing the video signal without shading, the output of said summer being applied to said analog-to-digital converter; and means operable during intervals in which said analog signal represents only shading to load said memory with digital words representing the pattern of said shading.

3. The system recited in claim 2 wherein said means operable during intervals in which said analog signal represents only shading comprises:

a switch connected to said digital memory to switch said digital memory between a load mode of operation and a read mode of operation.

4. The system recited in claim 3 wherein said means further comprises:

an analog-to-digital converter, the output of said summer being applied to said analog-to-digital converter, the analog-to-digital converter being connected to said memory to store digital words representing the pattern of said shading when said memory is in the load mode of operation.

5. The system recited in claim 4 further comprising:

a source of clock pulses, and counting means, said clock pulses being applied thereto to produce as outputs from said counting means address signals controlling said digital memory to store digital words in particular addresses therein.

6. The system recited in claim 5 wherein the output of one stage of said counting means is applied to said analog-to-digital converter to control the time at which the analog signal applied thereto is digitized.

7. The system recited in claim 6 wherein said scanning detector is a television type camera and wherein the outputs of stages of said counting means are applied to the horizontal synchronizing input and the vertical synchronizing input of said television type camera to synchronize the video television image with the storage of digital signals in said memory.

* * * * *